Dec. 19, 1944. C. L. HAYNES 2,365,549
GROOVING TOOL
Filed Jan. 14, 1943
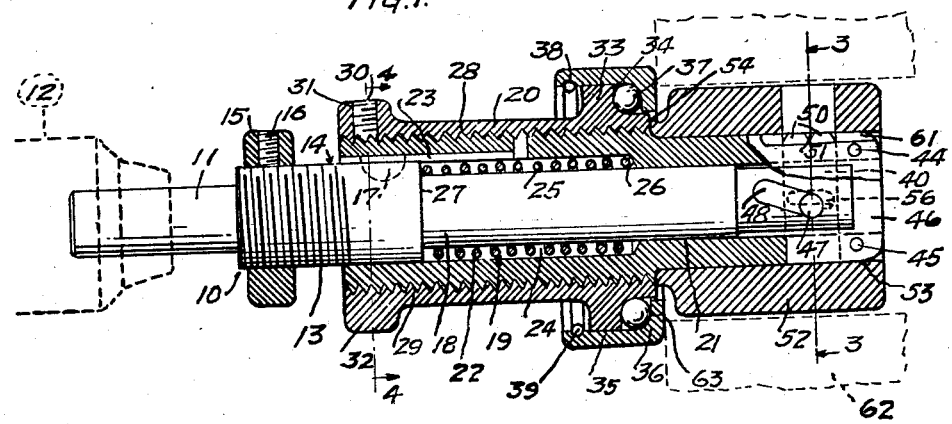
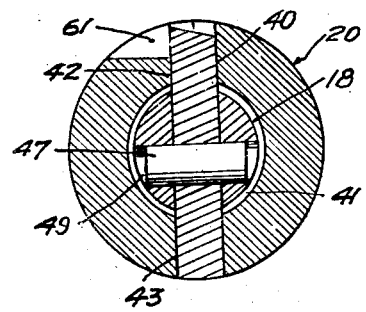
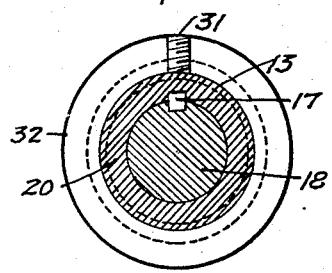
INVENTOR.
CHARLES L. HAYNES
BY
ATTY.

Patented Dec. 19, 1944

2,365,549

UNITED STATES PATENT OFFICE 2,365,549

GROOVING TOOL

Charles L. Haynes, Alhambra, Calif., assignor to C. F. Braun & Co., Alhambra, Calif., a corporation of California Application January 14, 1943, Serial No. 472,419

5 Claims. (Cl. 77—58)

This invention relates to a metal working tool and particularly pertains to a grooving tool.

In the construction and assembly of various tubular metal elements, it is desirable to provide means for forming an internal groove in a circular passageway, and in some instances to sever the wall of a member entirely. In performing these operations it often occurs that the bore of the elements to be grooved varies in diameter, and that tools of various sizes are required. It is the principal object of the present invention, therefore, to provide a grooving tool of the type described, which will operate to groove or cut off tubular members of various inside diameters, and which will perform a heavy duty operation rapidly and efficiently, the structure having the additional advantage that it is rugged in construction and that it is not liable to get out of order during use.

The invention contemplates the provision of a housing carrying a driving spindle and a laterally movable grooving tool, said spindle and tool being operatively associated so that the tool will be advanced and retracted upon alternate reciprocation of the spindle, the structure also carrying a pilot and adaptor by which the tool may be adapted for use in tubular members having bores of different diameters, whereby a grooving or cutting off operation may be performed.

The invention is illustrated by way of example in the accompanying drawing in which:

Figure 1 is a view in central longitudinal section showing the application of the present invention to a tubular body and indicating the positions of the elements while the grooving tool is in its retracted and operative positions.

Fig. 2 is an end view showing the assembled structure and the construction of the end of the cutter and the body carrying it.

Fig. 3 is a view in transverse section through the tool as shown on the line 3—3 of Fig. 1 and discloses the construction of the advancing and retracting means for the grooving tool.

Fig. 4 is a view in transverse section through the tool as seen on the line 4—4 of Fig. 1 and shows the spined connection between the housing, the driving spindle and the body member.

Referring more particularly to the drawing, 10 indicates a driving spindle. This spindle has a shank 11 to receive a chuck 12 of a driving motor. An enlarged portion 13 connects with the shank 11 and at its outer end is threaded as indicated at 14 to receive a collar 15, which is threaded thereon. A set screw 16 extends through a radial threaded bore in the collar and holds the collar in a locked position. The threaded section 14 of the portion 13 extends substantially half the length of the portion 13. The remaining length is cylindrical and is slotted to receive a Woodruff key 17. Beyond the portion 13 of the driving spindle 10 is a reduced cylindrical spindle length 18 which extends into a bore 19 of the grooving tool body 20. The grooving tool body is tubular and cylindrical. At one end it is formed by a central bore 21 which receives the portion 18 of the driving spindle and has a sliding fit with relation thereto. An enlarged bore 22 communicates with the bore 21 and receives the section 13 of the driving spindle and has a sliding fit with relation thereto. Formed for a suitable distance within the enlarged bore 22 is a keyway 23 which receives the key 17. Thus, the driving spindle 10 and the body member 20 have relative longitudinal movement while being keyed together. Due to the fact that the bore 22 of the body member is substantially greater in diameter than that of the spindle portion 18, an annular space 24 is provided to receive a helical spring 25. This spring is interposed between a shoulder 26 within the body member and a shoulder 27 on the spindle, so that longitudinal movement of the driving spindle into the body member will be resisted by the spring. A substantial length of the body member 20 is mounted within a housing 28. This housing has a central threaded bore 29 entirely through it, and the portion of the body member embraced by the housing is externally threaded so that it is threaded into the bore 29. A set screw 30 is mounted within a radial threaded opening 31 in the housing and holds the housing in place upon the body member 20. This set screw mounting is within an enlarged annular flange 32 at the outer end of the housing, the flange being smooth so that there will not be any irregular projections upon the rotating housing. The opposite end of the housing is formed with a circumferential flange 33. This flange is spaced from the adjacent end of the housing 28, and its forward face forms a ball race 34. Fitting over the flange 33 is a cap 35 which has a cylindrical portion embracing the outer circumference of the flange and an inner face forming a ball race 36. Ball-bearings 37 are interposed between the ball races 34 and 36. The rear edge of the cylindrical portion of the cap 35 overhangs the flange 33 and is formed with a semicircular groove 38 which receives a snap ring 39 acting to hold the cap in position and to retain the ball bearings 37 in place.

The spindle portion 18 of the driving spindle 10 carries a cutter 40. This cutter is rectangular in cross-section and extends transversely of the spindle portion 18 adjacent the end thereof and within a transverse slot 41. The length of the cutter is slightly less than the diameter of the body member 20, and thus the portions projecting from the opposite sides of the slot 41 extend into slots 42 and 43 in the end of the body member 20. The cutter is positioned a distance from the end of the body member and is retained in place by screws 44 and 45 which bridge the slots 42 and 43 and are arranged at diametrically opposite sides of the bore 21 in the body member so that the portion 18 of the spindle may reciprocate within this bore. The screws 44 and 45 also pass through a filler block 46 which fits into the end of the grooves 42 and 43 and provides a guide for the cutter 40. The filler block will also extend diametrically across the end of the bore 21, and since it is of a width agreeing with the slot 41 in the end of the spindle portion 18, the spindle portion 18 is free to reciprocate along opposite sides of this block as the cutter is manipulated. Extending transversely through the cutter 40 is a pin 47 which projects into inclined slots 48 formed in the end portion 49 of the length of spindle 18. These slots are disposed at an angle which will cause the cutter 40 to move laterally when the spindle 10 is advanced within the body 20. The angle here shown is approximately fifteen degrees. The cutter 40 is here shown as formed with two grooving teeth 50, which when in operation will form separate grooves in the bore of a member. These teeth are separated by an intermediate space 51 which will form a rib between the two grooves which are cut.

In order that the grooving tool may be used interchangeably within bores of different diameter, adaptor sleeves 52 are provided. These sleeves are cylindrical, having an outside diameter which makes a loose fit with the bore of the element to be grooved. A central bore 53' is formed through the adaptor and agrees in diameter with the outside diameter of the portion of the body member 20 extending in advance of shoulder 54 at the end of the housing 28. A keyway 55 is formed longitudinally of the bore 53 in the adaptor and receives a round end key 56 carried in the outer circumference of the body 20. Upon the diametrically opposite side of the adaptor is a threaded bore 57 which receives a set screw 58 and holds the adaptor in place upon the body member. Disposed radially through the wall of the adaptor 52 and in a plane at right angles to the keyway and the set screw 58 is a cutter slot 59 through which the cutter 40 may move. Adjacent the cutter slot 59 a segment of the outer face of the adaptor is cut away, as indicated at 60, to provide clearance for chips of the metal removed from the element being grooved. A similar segment 61 is cut away from the outer circumference of the body 20 for a similar purpose. These clearance spaces are both on the advancing side of the tool.

In operation of the present invention the structure is assembled as shown in Fig. 1. When the article to be grooved has a bore slightly greater than that of the extension portion of the body member 20 the tool may be used without the adaptor 52. Otherwise, an adaptor 52 is selected and slipped over the end of the body member 20 and held by the set screw 58. The end of the body member 20 or the adaptor 52 is then positioned within the member to be grooved, such for example as the element 62. While in this position the spring 22 holds the driving spindle 10 in its retracted position and thus holds the cutter 40 in a non-engaging position. The collar 15 may be set by the set screw 16 to determine the length of stroke of the spindle 10 into the body member 20 and thus the depth of penetration of the cutter into the work. The driving structure associated with the chuck 12 is then set in motion and force is exerted against the spindle 10. This will hold the end face 63 of the cap 35 against the work. In view of the fact that the cap 35 will frictionally engage the face of the work, there is a tendency for it to be held against rotation. The housing 28 and the spindle will thus rotate with relation to the cap 35, since these two members are keyed together by the key 17 operating in spline 23. As end force is exerted upon the spindle 10, the spindle will advance through the bore 21 of the body 20 and will shift the pin 47 laterally so that the cutter 40 will move into cutting engagement with the bore. This operation will continue until the collar 15 engages the outer end face of the body 20. Thus, the depth of the grooves will be limited. When end pressure is relieved from the driving spindle 10 the spring 25 will retract the spindle and simultaneously draw the cutter 40 back to its non-cutting position within the body member 20. It will be recognized that in the event the collar 15 is so adjusted or entirely removed as to permit the cutter 40 to form a kerf entirely through the tubular wall of a piece of work, the device will act as a suitable cut-off tool.

Attention is directed to the fact that the body 20 may be adjusted longitudinally within the housing 28. This makes it possible to shift the grooving tool so that it will operate at different depths within the tube sheet.

It will thus be seen that the structure here disclosed provides simple and effective means for grooving the wall of a bore to any desired depth and convenient means whereby the tool may be adapted for work within bores of different diameters.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A grooving tool, comprising a tubular body, a transverse slot at one end of said tubular body, a filler block disposed across said transverse slot and cooperating with the tubular body to provide a guide for a cutter bar, a cutter bar mounted within said slot to move transversely in a plane normal to the longitudinal axis of the tool and project outwardly to perform a grooving operation, an adapter sleeve mounted on the tubular body and formed with a guide opening through which said cutter bar moves, a driving spindle mounted within the tubular body and having a transverse slot at its outer end and across which the cutter bar extends, a driving connection at the opposite end of said spindle, means between the spindle and the cutter bar cooperating to advance and retract the cutter bar as the spindle advances and retracts within the body, said means including inclined slots formed within the portions of the spindle which straddle the cutter bar, a pin carried by the cutter bar and extending into said slots, yieldable means tending to retract the spindle and the cutter bar, a housing within which said tubular body is mounted, a thrust shoulder carried by the housing and bearing against the face of the article to be grooved, and a driving connection between the spindle and the tubular body whereby the spindle and tubular body may have relative longitudinal movement and the tubular body will be positively driven by the spindle.

2. The structure of claim 1 including means tending to urge the spindle to its retracted position.

3. The structure of claim 1 including adjustable means carried by the spindle and acting against the tubular body whereby the length of the cutting stroke of the cutter bar may be controlled.

4. A grooving tool adapted to form an annular groove along the surface of a cylindrical bore, which comprises a tubular body having a cylindrical end adapted to be inserted in said bore, a housing within which said body is mounted and with which it rotates, a thrust shoulder carried by the housing and bearing against the article to be grooved, a driving spindle mounted within the tubular body for longitudinal reciprocation, a positive driving connection between the spindle and the tubular body, a transverse guide formed adjacent the end of the tubular body, a cutter bar mounted within said guide and adapted to reciprocate in a plane normal to the longitudinal axis of the tool toward and away from the wall to be grooved, an operative connection between the driving spindle and said cutter bar, whereby the advance of the driving spindle will simultaneously advance the cutter bar and the retraction of the driving spindle will simultaneously retract the cutter bar, a tubular adaptor sleeve mounted upon the extending end of the body having an outside diameter substantially agreeing with the bore to be grooved, means for fastening said sleeve onto the body to rotate therewith, and a guide slot formed in the wall of said body and through which said cutter bar may move to engage the bore to be grooved.

5. A grooving tool, comprising a tubular body, a driving spindle extending therethrough and splined to the tubular body, whereby it may have longitudinal movement with relation to the tubular body, one end of said spindle projecting from an end of said tubular body to provide a driving connection, an adjustable collar on said projecting end whereby the longitudinal movement of the spindle with relation to the tubular body may be determined, a transverse slot formed in the opposite end of the driving spindle, cutter bars disposed in said slot and adapted to move transversely in a plane normal to the axis of the spindle, an adapter sleeve mounted upon the end of the tubular body within which the cutter bars are mounted and being formed with radial slots to receive the cutter bar and to guide it in its path of movement while preventing the cutter bar from moving longitudinally, an operative engagement between the spindle and the cutter bar whereby longitudinal movement of the spindle with relation to the tubular body will advance and retract the cutter bar through the adapter sleeve, a housing extending over a portion of the tubular body and threaded with relation thereto for longitudinal adjustment, an anti-friction bearing structure rotatable upon the housing and adapted to abut against the end of a tubular piece of work into which the tubular body and the adapter sleeve project, means for locking the housing with relation to the tubular body in its set position, and yieldable means retracting the spindle within the tubular body and thus acting to simultaneously retract the cutter bar from its cutting position.

CHARLES L. HAYNES.